United States Patent
Wu (12)

(10) Patent No.: US 12,043,301 B2
(45) Date of Patent: Jul. 23, 2024

(54) BACKREST ANGLE ADJUSTMENT MECHANISM AND INFANT CARRIER THEREOF

(71) Applicant: CHINA WONDERLAND NURSERYGOODS CO., LTD., Guangdong (CN)

(72) Inventor: Haitao Wu, Guangdong (CN)

(73) Assignee: CHINA WONDERLAND NURSERYGOODS CO., LTD., Dongguan (CN)

( * ) Notice: Subject to any disclaimer, the term of this patent is extended or adjusted under 35 U.S.C. 154(b) by 312 days.

(21) Appl. No.: 17/618,301

(22) PCT Filed: Sep. 17, 2019

(86) PCT No.: PCT/CN2019/106188
§ 371 (c)(1),
(2) Date: Dec. 10, 2021

(87) PCT Pub. No.: WO2020/248417
PCT Pub. Date: Dec. 17, 2020

(65) Prior Publication Data
US 2022/0363302 A1 Nov. 17, 2022

(30) Foreign Application Priority Data

Jun. 11, 2019 (CN) .......................... 201920876249.7

(51) Int. Cl.
*B62B 9/10* (2006.01)
(52) U.S. Cl.
CPC .................... *B62B 9/104* (2013.01)
(58) Field of Classification Search
CPC ............ B62B 9/104; B62B 9/102; B62B 9/10
See application file for complete search history.

(56) References Cited

U.S. PATENT DOCUMENTS

| 5,445,433 A | 8/1995 | Avihod |
| 5,490,685 A * | 2/1996 | Kitayama ............... B62B 9/104 |
| | | 280/47.38 |

(Continued)

FOREIGN PATENT DOCUMENTS

| CN | 2730710 Y | 10/2005 |
| CN | 101734273 A | 6/2010 |

(Continued)

OTHER PUBLICATIONS

Japanese Notice of Allowance issued in corresponding Japanese Application No. 2021-573574, dated Jul. 31, 2023, pp. 1-3.

(Continued)

*Primary Examiner* — James M Dolak
(74) *Attorney, Agent, or Firm* — HAUPTMAN HAM, LLP

(57) ABSTRACT

A backrest angle adjusting mechanism, suitable for being assembled between a seat body and a backrest of an infant carrier, having the seat body being installed on a frame, the backrest being rotatably connected to the seat body, and wherein the backrest angle adjusting mechanism includes a fixing member and an adjusting member. The fixing member is fixed on the backrest, one end is connected to the seat body or frame to form a connecting part, and the other end is bypassed around the fixing member to form an operating part. Operating the operating part causes the adjusting member to slide on the fixing member, and sliding the adjusting member brings the backrest to rotate with respect to the seat body, thereby adjusting an inclination angle of the backrest.

20 Claims, 3 Drawing Sheets

(56) References Cited

U.S. PATENT DOCUMENTS

| | | | | |
|---|---|---|---|---|
| 5,738,410 | A * | 4/1998 | Stroud | B62B 7/08 |
| | | | | 297/380 |
| 6,471,222 | B1 | 10/2002 | Hsia | |
| 6,908,100 | B2 * | 6/2005 | Kassai | B62B 7/123 |
| | | | | 280/643 |
| 7,128,326 | B2 | 10/2006 | Chen | |
| 7,284,797 | B2 * | 10/2007 | Huang | B62B 9/104 |
| | | | | 297/354.1 |
| 8,113,523 | B2 * | 2/2012 | Mountz | B62B 9/104 |
| | | | | 280/47.38 |
| 8,201,846 | B2 | 6/2012 | Yu et al. | |
| 9,050,991 | B2 * | 6/2015 | Wang | B65D 63/16 |
| 9,102,348 | B2 | 8/2015 | Miller et al. | |
| 9,610,966 | B2 * | 4/2017 | Zhong | B62B 7/142 |
| 10,407,090 | B2 | 9/2019 | Driessen | |
| 11,465,665 | B2 * | 10/2022 | Sturgeon | B62B 9/104 |
| 11,584,420 | B2 * | 2/2023 | Wu | B62B 7/006 |
| 11,851,100 | B2 * | 12/2023 | Zhong | B62B 9/104 |
| 11,858,544 | B2 * | 1/2024 | Wu | B62B 9/104 |
| 11,866,085 | B2 * | 1/2024 | Yuan | B62B 7/10 |
| 11,919,560 | B2 * | 3/2024 | Yi | B62B 7/04 |
| 2002/0158434 | A1 | 10/2002 | Hsia | |
| 2003/0052474 | A1 | 3/2003 | Yang et al. | |
| 2007/0102980 | A1 * | 5/2007 | Chen | B62B 9/104 |
| | | | | 297/354.12 |
| 2014/0062146 | A1 * | 3/2014 | Haut | B62B 7/08 |
| | | | | 297/183.1 |

FOREIGN PATENT DOCUMENTS

| | | |
|---|---|---|
| CN | 201816623 U | 5/2011 |
| CN | 103112484 A | 5/2013 |
| CN | 103661542 A | 3/2014 |
| CN | 106741110 A | 5/2017 |
| CN | 207191144 U | 4/2018 |
| KR | 101677214 B1 | 11/2016 |

OTHER PUBLICATIONS

Non-Final Office Action issued in corresponding U.S. Appl. No. 17/404,110, dated Jul. 11, 2022, pp. 1-13.
Japanese First Office Action issued in corresponding Japanese Application No. 2021-573574, dated Feb. 13, 2023, pp. 1-6.
International Search Report issued in corresponding International Application No. PCT/CN2019/106188, dated Mar. 3, 2020, pp. 1-4.

* cited by examiner

BACKREST ANGLE ADJUSTMENT MECHANISM AND INFANT CARRIER THEREOF

RELATED APPLICATION

The present application is a National Phase of International Application No. PCT/CN2019/106188, filed Sep. 17, 2019, which claims priority to Chinese Patent Application No. 201920876249.7, filed Jun. 11, 2019.

TECHNICAL FIELD

The disclosure relates to an infant carrier, and particularly to a backrest angle adjusting mechanism and an infant carrier having the backrest angle adjusting mechanism.

BACKGROUND

An infant carrier, such as a stroller, a baby seat, a safety seat and the like generally has a seat body and a backrest. At present, there are two common types of infant carriers in the market, and one of them is an infant carrier being relatively simple with a non-adjustable backrest. Such an infant carrier, because its backrest and seat body are fixedly arranged, and the inclination angle of the backrest is not adjustable, cannot meet different usage requirements well, thereby reducing the comfort of use and the adaptability. Another common infant carrier has a backrest with an inclination angle being adjustable in respect with the seat body, but the structure of the adjustment mechanism is relatively complicated, the manufacturing cost is high, and the operation is complex, thereby making the entire structure of the infant carrier relatively complicated and inconvenient to operate, which affects the use of users.

SUMMARY

An object of the disclosure is to provide a backrest angle adjusting mechanism which is simple in structure, easy to operate, low in cost, and capable of adjusting the backrest, so as to ensure the comfort of the baby and infant riding in the infant carrier.

Another object of the disclosure is to provide an infant carrier equipped with a backrest angle adjusting mechanism which is simple in structure, easy to operate, low in cost, and capable of adjusting the backrest, so as to ensure the comfort of the baby and infant riding in the infant carrier.

In order to achieve the above objects, the disclosure provides a backrest angle adjusting mechanism which is suitable for being assembled between a seat body and a backrest of an infant carrier, with the seat body installed on the frame and the backrest rotatably connected to the seat body. The backrest angle adjusting mechanism comprises at least a fixing member and at least one adjusting member, the fixing member is fixed on the backrest, and one end of the adjusting member is connected to the seat body or the frame to form a connecting part, and the other end of the adjusting member is passed around the fixing member to form an operating part, operating of the operating part causes the adjusting member to slide on the fixing member, and sliding of the adjusting member brings the backrest to rotate in respect to the seat body, thereby adjusting an inclination angle of the backrest.

Preferably, the adjusting member includes a first adjusting section connected to the connecting part and the fixing member and a second adjusting section connected to the fixing member and the operating part, and when the adjusting member slides on the fixing member, a length of the first adjusting section and a length of the second adjusting section changes in inverse proportion.

Preferably, the backrest has a lying state relatively flush with the seat body and an upright state relatively perpendicular to the seat body. The first adjustment section changes from short to long and the back rest is adjusted from the upright state to the lying state, while the first adjustment section changes from long to short and the back rest is adjusted from the lying state to the upright state.

Preferably, a fixing member is fixed on the middle and upper portion of the backrest, and the two adjusting members are symmetrically wound on the fixing member.

Preferably, the fixing member and the adjusting member are arranged in one-to-one correspondence.

Preferably, a fixing member is fixed on the middle and upper portion of the backrest, and the head and tail ends of an adjusting member are respectively connected with both sides of the seat body or frame to form two connecting parts, and the central part of the adjusting member is wound passing the fixing member to form an operating part.

Preferably, the two fixing member are symmetrically fixed on the backrest, and each fixing member is wound with an adjusting member.

Preferably, a plurality of fixing members are arranged on the backrest in parallel and spaced with each other, and a plurality of adjusting members are wound on the plurality of fixing members in one-to-one correspondence.

Preferably, the fixing member is provided with a guide groove, and the adjusting member is penetrated into the guide groove and can slide in the guide groove.

Preferably, the guide groove is arranged in a direction parallel to or perpendicular to the longitudinal direction of the backrest.

Preferably, the guide groove is an arc groove.

Preferably, the fixing member also includes at least one anti-dropping member, which is arranged in the guide groove to prevent the adjusting member from separating from the guide groove.

Preferably, the anti-dropping member is located at the relative center of the guide groove and protrudes from the notch of the guide groove, and the anti-dropping member is provided with a through hole communicated with the guide groove.

Preferably, the fixing member also includes at least one limiting member, which is arranged in the guide groove to limit the sliding direction of the adjusting member.

Preferably, when the operating part is operated so that the limiting element is relatively flush with the connecting part, the backrest is adjusted to a more upright position relative to the seat body.

Preferably, the fixing member comprises a positioning part and a guiding part connected with each other, the positioning part is fixedly connected with the backrest, the guiding part and the positioning part are arranged parallel to or perpendicular to each other, and the guide groove is arranged on the guiding part.

Preferably, the positioning part and the guiding part are an integrated structure.

Preferably, the backrest angle adjusting mechanism of the disclosure further comprises at least one locking member, the other end of the adjusting member passes through the locking member after bypassing around the fixing member, the locking member is used to lock the first adjusting section and the second adjusting section at a position after a length adjustment.

Preferably, at least two adjusting members are inserted and connected to a locking member.

Preferably, the adjusting member is a rope.

The disclosure further provides an infant carrier comprising a frame, a seat body connected to the frame, a backrest pivoted to the seat body, a backrest angle adjusting mechanism connected to the backrest and the seat body or to the backrest and the frame, and the backrest angle adjusting mechanism is defined as above.

Compared with the related art, the backrest angle adjusting mechanism of the disclosure comprises at least a fixing member and at least an adjusting member. The fixing member is fixed to a backrest. One end of the adjusting member is connected to the seat body or frame to form a connecting part, and the other end of the adjusting member bypasses around the fixing member to form an operating part. The operating part is operated such that the adjustment member is slide on the fixing member, sliding of the adjusting member may bring the backrest to rotate the seat body in respect to the seat body, thereby adjusting an inclination angle of the backrest to meet different usage requirements. The backrest angle adjusting mechanism of the disclosure is simple in structure and convenient in operation, which effectively reduces manufacturing costs, so that the backrest may be freely varied between a reliable vertical upright state and a supportable lying state, thereby effectively ensuring the comfort and safety of the baby or infant in an infant carrier having the backrest angle adjusting mechanism.

DETAILED DESCRIPTION

In order to describe the technical content and structural features of the disclosure in detail, the following illustration is provided conjunction with the embodiments and the accompanying drawings.

Figure 1:
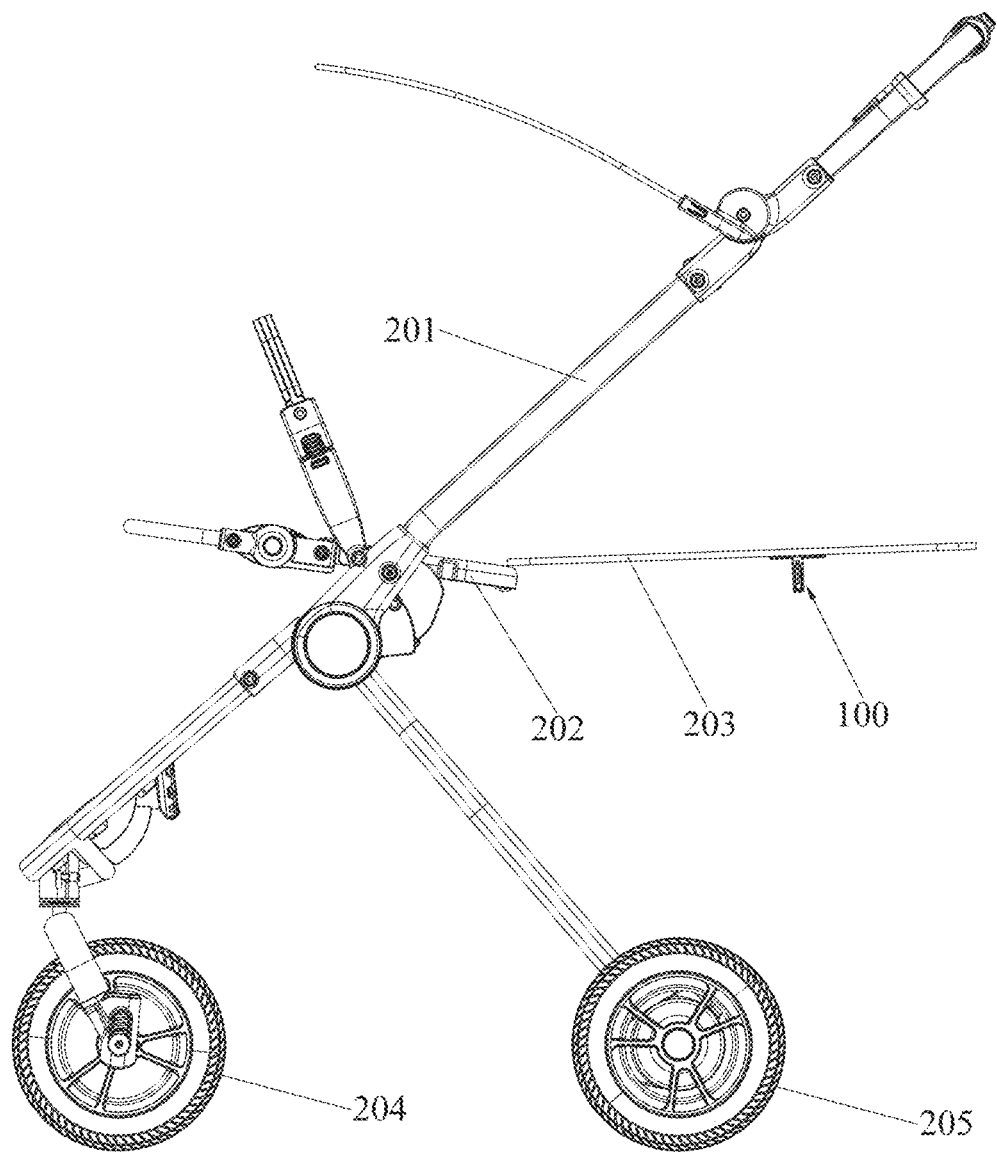
FIG. 1 is a schematic view of an infant carrier of the disclosure.

Referring to FIG. 1, a backrest angle adjusting mechanism 100 and an infant carrier 200 having the backrest angle adjusting mechanism 100 are provided in this disclosure. The infant carrier 200 includes, but is not limited to, e.g., a stroller, a carrycot, a bed, a baby basket, a safety seat and the like. Specifically, in the embodiments, the infant carrier 200 of the disclosure may be a stroller including a frame 201, a seat body 202 connected to the frame 201, a backrest 203 pivoted to the seat body 202, and a backrest angle adjusting mechanism 100 connected to the backrest 203 and the seat body 202 or to the backrest 203 and the frame 201. Moreover, a front wheel 204 and rear wheels 205 are disposed on front and rear sides of the frame 201 respectively. The backrest 203 can be rotated by the backrest angle adjusting mechanism 100 in respect to the seat body 202, so as to adjust an inclination angle of the seat body 202 to meet different usage requirements. According to the preferred embodiments of the disclosure, the backrest angle adjusting mechanism 100 may cause the backrest 203 to rotate in a front and a rear directions on the seat body 202, such that the backrest 203 may be in a lying state relatively flush with the seat body 202 or in a vertical upright state in respect to the seat body 202, thereby facilitating a baby or infant lying down or sitting in the infant carrier 200. FIG. 1 shows the backrest 203 in the lying state. Of course, the backrest 203 may also be adjusted to an inclined state between the lying state and the vertical upright state.

Figure 2:
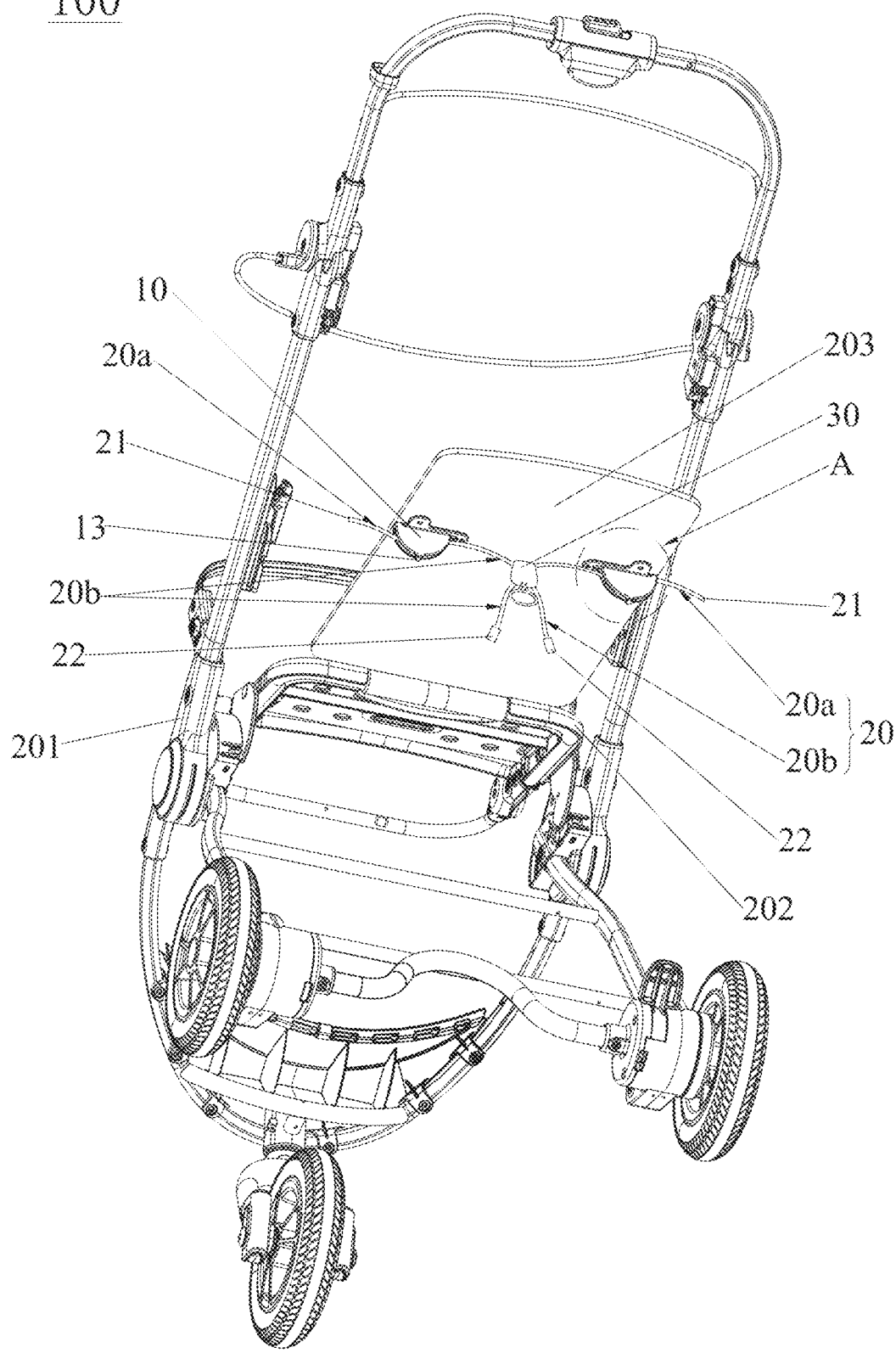
FIG. 2 is a schematic view of a back angle adjustment mechanism of the disclosure installed on an infant carrier.

Referring to FIG. 2, the backrest angle adjusting mechanism 100 of the disclosure includes at least a fixing member 10 and at least an adjusting member 20. The fixing member 10 is fixed on the backrest 203. One end of the adjusting member 20 is connected to the seat body 202 or the frame 201 to form a connecting part 21, and the other end of the adjusting member 20 is passed around (bypasses round) the fixing member 10 to form an operating part 22. The operating part 22 is operated such that the adjusting member 20 slides on the fixing member 10. The backrest 203 rotates in respect to the seat body 202 by the sliding of the adjusting member 20, so as to adjust the inclination angle of the backrest 203. The adjusting member 20 includes a first adjusting section 20a connected between the connecting part 21 and the fixing member 10 and a second adjusting section 20b connected between the fixing member 10 and the operating part 22. Since the connecting part 21 of the adjusting member 20 is fixed to the seat body 202 or frame 201, and the overall length of the adjusting member 20 remains certain, when the adjusting member 20 slides on the fixing member 10, the length of the first adjusting section 20a and the length of the second adjusting section 20b are changed in inverse proportion, and the inclination angle of the backrest 203 may be adjusted by changing the length ratio between the two adjusting sections. In details, the first adjusting section 20a is changed from short to long, and the backrest 203 will be adjusted from the vertical upright state toward the lying state, and the first adjusting section 20a is changed from long to short, then the backrest 202 will be adjusted from the lying state toward the vertical upright state. Preferably, the adjusting member 20 is a rope with simple structure and low cost, which effectively reduces the production cost.

The fixing member 10 and the adjusting member 20 can be in one-to-one correspondence. When both the number of the fixing member 10 and the number of the adjusting member 20 are one, the fixing member 10 may be fixed at middle and upper portion of the backrest 203, and the head and tail ends of the adjusting member 20 are respectively connected to both sides of the seat body 202 or the frame 201 to form two connecting parts 21. A center end of the adjusting member 20 is passed around the fixing member 10 to form an operating part 22. Then, by pulling the operating part 22 with one hand, adjustment operation of the backrest 203 can be performed, and the structure is simple and the operation is convenient. Of course, if the number of the fixing member 10 a is one and the fixing member 10 is fixed on the middle and upper portion of the backrest 203, the number of the adjusting member 20 would be set to two, and the two adjusting members 20 may be symmetrically wound on the fixing member 10. Then, connecting parts 21 of the two adjusting members 20 are symmetrically connected to both sides of the seat body 202 or the frame 201, and the operating parts 22 of the two adjusting members 20 are symmetrically passed around the fixing member 10, so by pulling the two operating parts 22, the adjustment of the backrest 203 may also be performed.

As shown in FIG. 2, in the preferred embodiments of the disclosure, in order to ensure the stability and smoothness of the adjustment of the backrest 203, the number of the fixing member 10 can be set to two. The two fixing member 10 are fixed symmetrically on two edges of the backrest 203. Each of the fixing members 10 being wound by one adjusting member 20, and the adjusting members 20 are connected to the seat body 202 or the frame 201. The two fixing members 10 and the two adjusting members 20 are arranged symmetrically, such that force applied on the backrest 203 may be distributed more even when the backrest 203 is adjusted, and the adjustment of the backrest 203 is more stable and smooth. Of course, if the number of the fixing member 10 is two, the number of the adjusting member 20 may also be one. After a head end of one the adjusting member 20 is connected to one side of the seat body 202 or one side of the frame 201 to form one connecting part 21, a tail end of the adjusting member 20 bypasses round the two fixing members 10 in turn and forms an operating part 22 between the two fixing members, and then the tail end of the adjusting member is connected to the opposite side of the seat body 202 or frame 201 to form the other connecting part 21. Then, by pulling the operating part 22 with one hand, the adjustment operation of the backrest 203 may be realized, so the adjustment of the backrest 203 is stable and convenient. In addition, the number of the fixing member 10 may be more than one, and a plurality of the fixing member 10 are arranged on the backrest 203 in parallel and spaced apart with each other, and the plurality of the adjusting members 20 are wound on the plurality of fixing members 10 in one-to-one correspondence relationship. Moreover, the plurality of the adjusting members 20 are also respectively connected to the seat body 202 or the frame 201. So, by arranging multiple pulling points, force applied on the entire backrest 203 may be distributed more even, such that the adjustment is more stable and smooth, and further improves use comfort and safety of the infant carrier 200.

Figure 3:
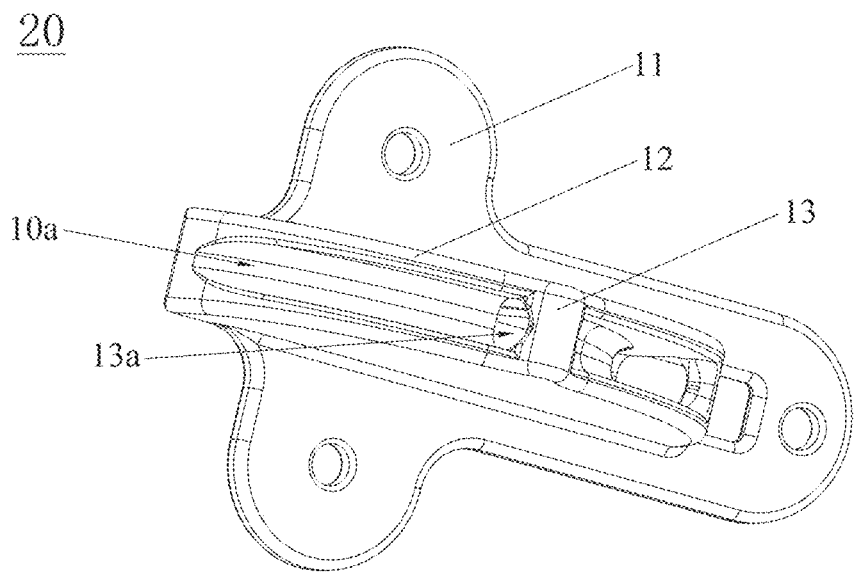
FIG. 3 is a schematic view of the adjustment member of the disclosure.
Figure 4:
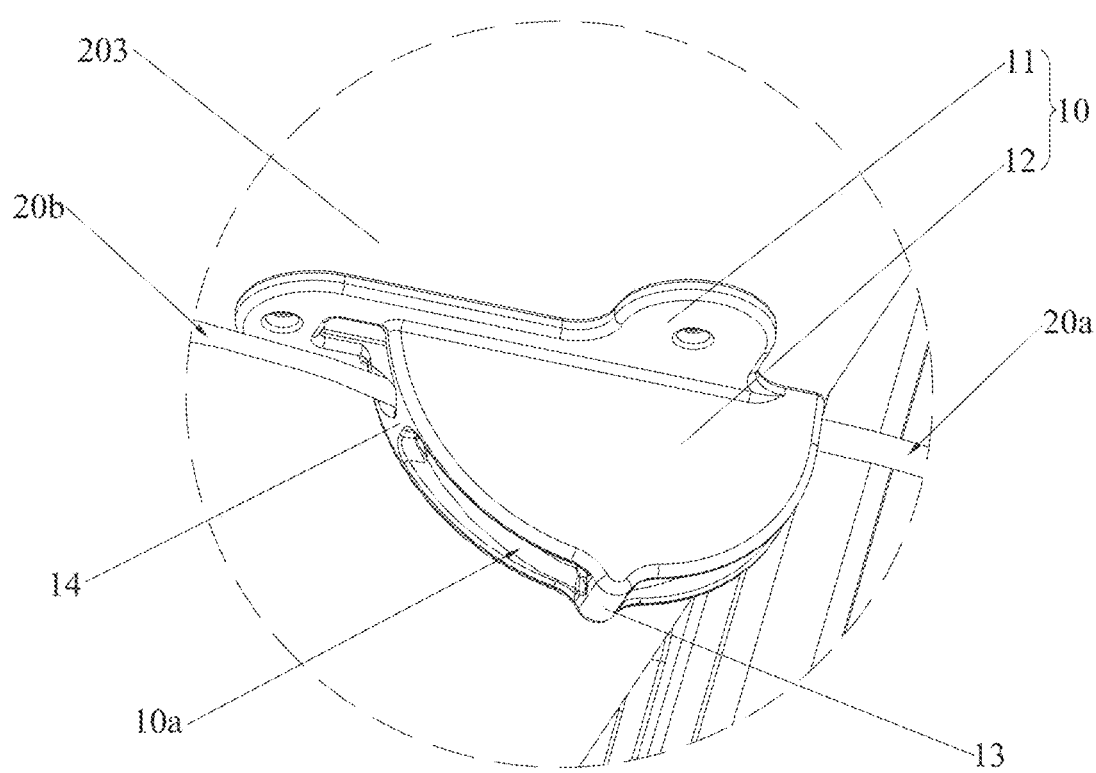
FIG. 4 is an enlarged view of the part A in FIG. 2.

Referring to FIGS. 2 to 4, in order to facilitate inserting and sliding of the adjusting member 20, a guide groove 10a is disposed on the fixing member 10. The adjusting member 20 is inserted in the guide groove 10a and may slide in the guide groove 10a. The guide groove 10a may be arranged in a direction parallel to or perpendicular to a longitudinal direction of the backrest 203. Preferably, guide groove 10a is an arc-shaped groove. Specifically, the fixing member 10 has a positioning part 11 and a guiding part 12 which are connected to each other. The positioning part 11 and the backrest 203 are fixedly connected by thread. The guide groove 10a is disposed on the guiding part 12, and the guiding part 12 and the positioning part 11 are arranged parallel to or perpendicular to each other, such that the guiding groove 10a is arranged in a direction parallel to or perpendicular to the longitudinal direction of the backrest 203. Preferably, the positioning part 11 and the guiding part 12 are an integral structure, so that on the basis of simplifying the structure, the assembly process is optimized, and the manufacturing cost is further reduced.

Referring to FIGS. 3 to 4, the fixing member 10 further includes at least an anti-dropping member 13. The anti-dropping member 13 is disposed in the guide groove 10a, in order to prevent the adjusting member 20 from being separated from the guide groove 10a. Specifically, the anti-dropping member 13 is located at a relative center of the guide groove 10a and protrudes from an opening of the guide groove 10a. A through hole 13a communicating with the guide groove 10a is disposed in the anti-dropping member 13. Then the adjusting member 20 may penetrate into the guiding groove 10a from one side of the guiding groove 10a and pass through the through hole 13a and then pass out of the other side of the guiding groove 10a, so as to effectively prevent the adjusting member 20 from leaving the guiding groove 10a during the pulling process. Preferably, the anti-dropping member 13 may be formed by protruding and buckling of both groove walls of the guide groove 10a in a direction away from the opening, and the arrangement that the anti-dropping member 13 and the guide groove 10a being integrated may further simplify the structure.

Referring to FIGS. 2 to 4, the fixing member 10 further includes at least a limiting member 14. The limiting member 14 is disposed in the guide groove 10a for limiting a sliding direction of the adjusting member 20 in the guide groove 10a. Moreover, the limiting member 14 may be disposed at an outlet end of the guide groove 10a, so as to limit an angle of the adjusting member 20 when it passes out, so as to make an adjustment. Of course, the limiting member 14 may also be disposed at an inlet end of the guide groove 10a, so as to facilitate the penetration of the adjusting member 20. Specifically, the limiting member 14 is flush with the direction of the opening of the guide groove 10a, and the limiting member 14 and a bottom wall of the guide groove 10a are arranged in parallel and spaced apart, so as to limit sliding of the adjusting member 20 which is inserted between the bottom wall and the limiting member 14, thereby keeping the adjusting member 20 always sliding in the direction of the guide groove 10a. When the operating part 22 of the adjusting member 20 is operated to cause the adjusting member 20 to slide on the fixing member 10, thereby driving the backrest 203 to rotate in respect to the seat body 202. When the backrest 203 rotates to bring the fixing member 10 to rotate so that its limiting member 14 and the connecting part 21 of the adjusting member 20 are relatively flush, the backrest 203 is adjusted to a position more upright in respect to the seat body 202. It would be noted, in the prior art, the backrest generally can only be adjusted to a position where it is flush with the pivot point of the seat body 202, and often the backrest and the seat body are not completely perpendicular in respect each other. However, in the present application, since the backrest 203 is located on a relative front side of the fixing member 10, when the limiting member 14 of the fixing member 10 rotates to be relatively flush with the connecting part 21, the backrest 203 is actually inclined more forward, and the backrest 203 of the present application is more upright respect to the seat body 202.

Referring to FIG. 2, the backrest angle adjusting mechanism 100 of the disclosure further comprises at least a locking member 30. The other end of the adjusting member 20 bypasses around the fixing member 10 and then is inserted through the locking member 30 so as to form an operating part. The locking member 30 is used to lock the first adjusting section 20a and the second adjusting section 20b at a position after a length adjustment. Specifically, at least two adjusting members 20 pass through a locking member 30, thereby simplifying the structure, realizing synchronous pulling operations, and making adjustments easier. It would be noted, the structure of the locking member 30 is a conventional structure, as long as the pulling and locking of the adjusting member 20 can be realized, it will not be described in detail here. Of course, if the locking member 30 is not provided, the disclosure may also perform the adjustment of the backrest 203 by providing a clamp-fitting structure which fitted by clamping with each other on the adjusting member 20 and the fixing member 10. In addition, locking may be further simplified by directly pulling the adjusting member 20 and then knotting/positioning it.

Compared with the related art, the backrest angle adjusting mechanism 100 of the disclosure comprises at least a fixing member 10 and at least an adjusting member 20. The fixing member 10 is fixed to a backrest 203. One end of the adjusting member 20 is connected to a seat body 202 or a frame 201 to form a connecting part 21, and the other end of the adjusting member 20 is passed around the fixing member 10 to form an operating part 22. When the operating part is operated such that the adjusting member 20 slides on the fixing member 10, the sliding of the adjusting member 20 brings the backrest 203 to rotate in respect to the seat body 202, thereby adjusting an inclination angle of the backrest 203 to meet different usage requirements. The backrest angle adjusting mechanism 100 of the disclosure is simple in structure and convenient in operation, and can effectively reduce manufacturing costs, so that the backrest 203 may be freely switched between a reliable vertical upright state and a supportable lying state, thereby effectively ensuring the comfort and safety of the baby or infant in an infant carrier 200 having the backrest angle adjusting mechanism 100.

What disclosed above are only preferred embodiments of the disclosure, and the scope of the disclosure certainly cannot be limited by this. Therefore, any equivalent changes made according to the scope of the disclosure still belong to the disclosure.

What is claimed is:

1. A backrest angle adjusting mechanism for being assembled with a seat body and a backrest of an infant carrier, the seat body being installed on a frame of the infant carrier, the backrest being rotatably connected to the seat body, wherein the backrest angle adjusting mechanism comprises:
    at least one fixing member; and
    at least one adjusting member;
    wherein the at least one fixing member is fixed on the backrest, one end of the at least one adjusting member is connected to the seat body or the frame to form a connecting part, and the other end of the at least one adjusting member is bypassed around the at least one fixing member to form an operating part, operating of the operating part causes the at least one adjusting member to slide on the at least one fixing member, and sliding of the at least one adjusting member brings the backrest to rotate in respect to the seat body, so as to adjust an inclination angle of the backrest, and
    wherein the at least one fixing member includes
        a convex portion protruding from the backrest in a direction crossing the backrest, and
        a guide groove on an outer surface of the convex portion for guiding the at least one adjusting member to slide therein.

2. The backrest angle adjusting mechanism according to claim 1, wherein
    the at least one adjusting member includes
        a first adjusting section connected to the connecting part and the at least one fixing member and
    a second adjusting section connected to the at least one fixing member and the operating part, and
    in response to the at least one adjusting member slides sliding on the at least one fixing member, a length of the first adjusting section increases while a length of the second adjusting section decreases, or vice versa. changes in inverse proportion.

3. The backrest angle adjusting mechanism according to claim 2, wherein
    the backrest has a lying state relatively flush with the seat body and an upright state relatively perpendicular to the seat body,
    the length of the first adjusting section increases to adjust the backrest from the upright state to the lying state, and
    the length of the first adjusting section decreases to adjust the backrest from the lying state to the upright state.

4. The backrest angle adjusting mechanism according to claim 1, wherein
    the at least one fixing member is fixed on a middle and upper portion of the backrest, and
    the at least one adjusting member includes two adjusting members that are symmetrically wound on the at least one fixing member.

5. The backrest angle adjusting mechanism according to claim 1, wherein
    the at least one fixing member corresponds to the at least one adjusting member.

6. The backrest angle adjusting mechanism according to claim 5, wherein the at least one fixing member is fixed on a middle and upper portion of the backrest, a head end and a tail end of the at least one adjusting member are connected to two sides of the seat body or the frame, respectively, so as to form two connection parts, a center of the at least one adjusting member bypasses around the at least one fixing member so as to form the operating part.

7. The backrest angle adjusting mechanism according to claim 5, wherein
    the at least one fixing member includes two fixing members symmetrically fixed on the backrest,
    the at least one adjusting member includes two adjusting members, and
    each of the two fixing members is wound with a corresponding adjusting member of the two adjusting members.

8. The backrest angle adjusting mechanism according to claim 5, wherein
    the at least one fixing member includes a plurality of fixing members arranged on the backrest in parallel and spaced with each other, and
    the at least one adjusting member includes a plurality of adjusting members wound on the plurality of fixing members, respectively.

9. The backrest angle adjusting mechanism according to claim 5, wherein the at least one adjusting member penetrates into the guide groove.

10. The backrest angle adjusting mechanism according to claim 9, wherein the guide groove is arranged in a direction parallel to or perpendicular to a longitudinal direction of the backrest.

11. The backrest angle adjusting mechanism according to claim 9, wherein the guide groove is an arc groove.

12. The backrest angle adjusting mechanism according to claim 9, further comprising at least one anti-dropping member, which is arranged in the guide groove to prevent the at least one adjusting member from separating from the guide groove.

13. The backrest angle adjusting mechanism according to claim 12, wherein
    the anti-dropping member is located at a relative center of the guide groove and protrudes from a notch of the guide groove, and
    the anti-dropping member is provided with a through hole communicated with the guide groove.

14. The backrest angle adjusting mechanism according to claim 9, further comprising at least one limiting member, which is arranged in the guide groove to limit a sliding direction of the at least one adjusting member.

15. The backrest angle adjusting mechanism according to claim 14, wherein the operating part is operated so that the at least one limiting element is relatively flush with the connecting part, the backrest is adjusted to a more upright position relative to the seat body.

16. The backrest angle adjusting mechanism according to claim 9, wherein
the at least one fixing member comprises a positioning part and a guiding part connected with each other, the guiding part being defined by the convex portion,
the positioning part is fixedly connected to the backrest,
the guiding part and the positioning part are arranged parallel to or perpendicular to each other, and
the guide groove is arranged on the guiding part.

17. The backrest angle adjusting mechanism according to claim 16, wherein the positioning part and the guiding part are an integrated structure.

18. The backrest angle adjusting mechanism according to claim 2, further comprising at least one locking member, wherein
the other end of the at least one adjusting member passes through the at least one locking member after bypassing around the at least one fixing member, and
the at least one locking member is configured to lock the first adjusting section and the second adjusting section at a position after a length adjustment.

19. The backrest angle adjusting mechanism according to claim 18, wherein the at least one adjusting member includes two adjusting members inserted and connected to the at least one locking member.

20. The backrest angle adjusting mechanism according to claim 1, wherein the at least one adjusting member is a rope.

* * * * *